United States Patent
Kim et al.

(10) Patent No.: US 11,493,987 B2
(45) Date of Patent: Nov. 8, 2022

(54) POWER MODE SWITCHING

(71) Applicant: HEWLETT-PACKARD DEVELOPMENT COMPANY, L.P., Spring, TX (US)

(72) Inventors: Suwhan Kim, Pangyo (KR); SaeJin Park, Pangyo (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/043,476

(22) PCT Filed: Apr. 9, 2019

(86) PCT No.: PCT/US2019/026575
§ 371 (c)(1),
(2) Date: Sep. 29, 2020

(87) PCT Pub. No.: WO2019/199821
PCT Pub. Date: Oct. 17, 2019

(65) Prior Publication Data
US 2021/0055782 A1     Feb. 25, 2021

(30) Foreign Application Priority Data

Apr. 11, 2018   (KR) .................. 10-2018-0042425

(51) Int. Cl.
*G06F 1/3287*   (2019.01)
*G06F 1/3231*   (2019.01)
*H04N 1/00*     (2006.01)

(52) U.S. Cl.
CPC .......... *G06F 1/3287* (2013.01); *G06F 1/3231* (2013.01); *H04N 1/00896* (2013.01)

(58) Field of Classification Search
CPC .. G06F 1/3287; G06F 1/3231; H04N 1/00896
See application file for complete search history.

(56) References Cited

U.S. PATENT DOCUMENTS 5,925,132 A    7/1999  Kadokura
9,485,377 B2  11/2016  Utsunomiya
(Continued)

FOREIGN PATENT DOCUMENTS

| JP | 2010157789 A | 7/2010 |
| JP | 20130033050  | 2/2013 |
| JP | 2017165103 A | 9/2017 |

*Primary Examiner* — Nimesh G Patel
(74) *Attorney, Agent, or Firm* — Staas & Halsey LLP (57) ABSTRACT

An image forming apparatus includes a user interface device, an image forming operation unit, a detection sensor having a two-dimensional structure including a plurality of sensor columns of sensors, a power supply to supply power to the user interface device and the image forming operation unit according to power modes including a sleep mode and a standby mode, in which the power supply is to supply more power in the standby mode than in the sleep mode, and a controller. The controller is to switch a power mode from the sleep mode to the stand-by mode, when a first condition is satisfied based on sensor data detected by the sensor columns, the first condition being a condition in which results of calculations performed on data, of the sensor data, corresponding to consecutive sensor columns among the plurality of sensor columns are each equal to or greater than a threshold value simultaneously for a period of time, to indicate detection of a human body, and to control the power supply to supply power corresponding to the switched power mode to the user interface device and the image forming operation unit.

15 Claims, 9 Drawing Sheets

(56) References Cited

U.S. PATENT DOCUMENTS

| | | | |
|---|---|---|---|
| 10,855,952 B1* | 12/2020 | Rocklin | H04L 65/1069 |
| 2013/0010335 A1* | 1/2013 | Baba | H04N 1/00891 |
| | | | 358/3.01 |
| 2014/0063528 A1 | 3/2014 | Hirose | |
| 2014/0104630 A1* | 4/2014 | Baba | H04N 1/00323 |
| | | | 358/1.13 |
| 2014/0302893 A1* | 10/2014 | Dhavaloganathan | |
| | | | H04M 1/72463 |
| | | | 455/566 |
| 2014/0368855 A1 | 12/2014 | Yamano | |
| 2015/0227328 A1 | 8/2015 | Yokoyama | |
| 2015/0278665 A1 | 10/2015 | Imamura | |
| 2016/0052260 A1 | 2/2016 | Imamura | |
| 2017/0096299 A1* | 4/2017 | Yang | G01J 1/4204 |
| 2021/0055782 A1* | 2/2021 | Kim | G06F 1/3231 |

* cited by examiner

POWER MODE SWITCHING

CROSS REFERENCE TO RELATED APPLICATIONS

This application is filed under 35 U.S.C. 0.371 as a National Stage of PCT International Application No. PCT/US2019/026575, filed on Apr. 9, 2019, in the U.S. Patent and Trademark Office, which claims the priority benefit of Korean Patent Application No. 10-2018-0042425, filed on Apr. 11, 2018, in the Korean Intellectual Property Office. The disclosures of PCT International Application No. PCT/US2019/026575 and Korean Patent Application No. 10-2018-0042425 are incorporated by reference herein in their entireties.

BACKGROUND

Electronic devices may be operated in a power saving mode to reduce power consumption. In such a power saving mode, power consumption may be reduced by replacing high-power-consuming functions with low-power-consuming functions or by turning off unnecessary functions.

In addition, image forming apparatuses may be operated in a power saving mode to reduce power consumption. If an image forming apparatus is not used for a long period of time, the image forming apparatus may enter into a power saving mode.

DETAILED DESCRIPTION

Expressions such as "at least one of," when preceding a list of elements, modify the entire list of elements and do not modify the individual elements of the list.

Hereinafter, various examples will be described with reference to the accompanying drawings. In the following description and accompanying drawings, elements having substantially the same functions and structures will be indicated with the same reference numerals, and repeated descriptions thereof will be omitted.

Figure 1:
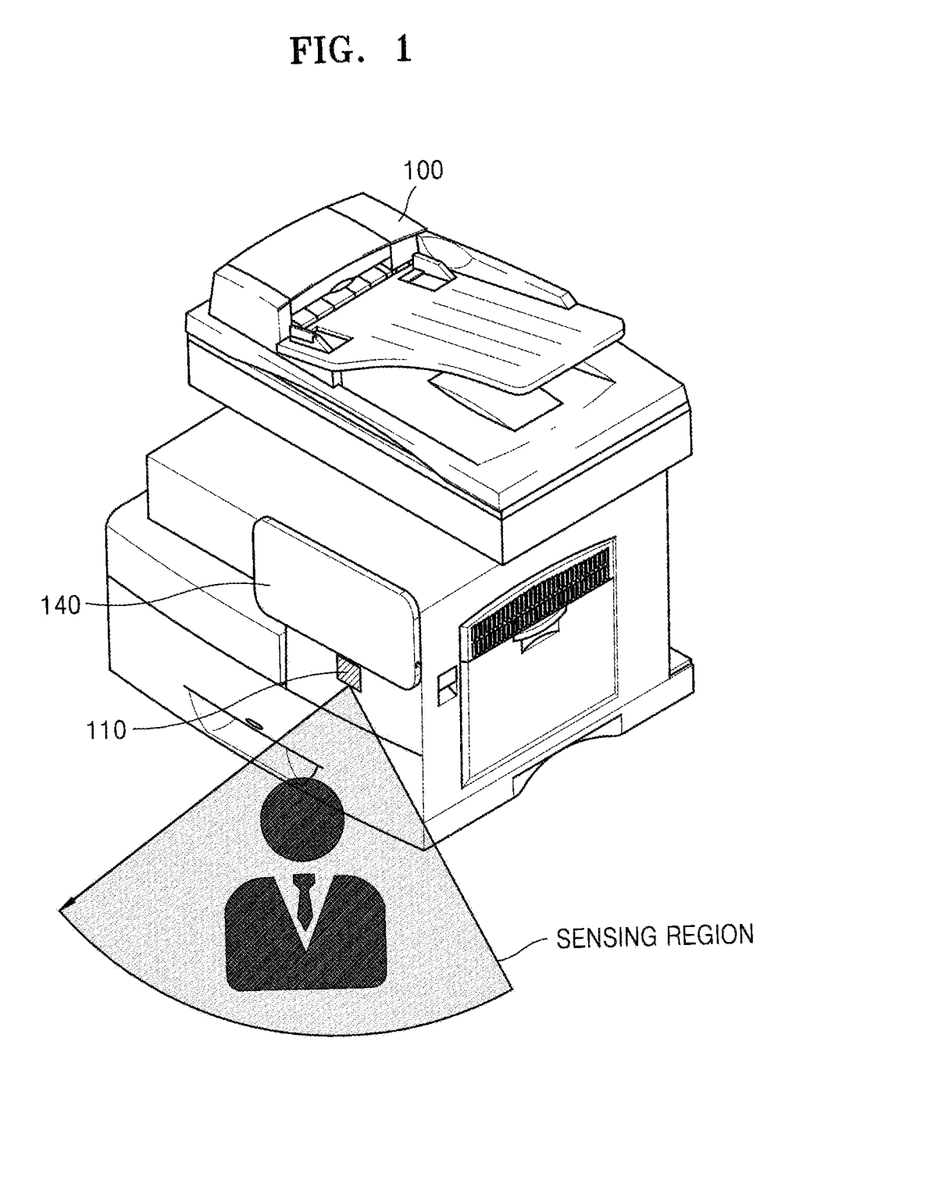
FIG. 1 is a view illustrating an image forming apparatus according to an example.

FIG. 1 is a view illustrating an image forming apparatus 100 according to an example.

The image forming apparatus 100 may perform an image forming operation for printing, scanning, or faxing. The image forming apparatus 100 may perform an image forming operation according to a user input received through a user interface device 140.

Referring to FIG. 1, the positions of a human body detection sensor 110 and the user interface device 140 on the image forming apparatus 100 are illustrated. The human body detection sensor 110 may be provided on at least one lateral outer surface of the image forming apparatus 100. For example, the human body detection sensor 110 may be located on a lateral surface of the image forming apparatus 100 on which the user interface device 140 is located. The human body detection sensor 110 may be provided close to the user interface device 140 to detect a user approaching the user interface device 140 to use the image forming apparatus 100. The human body detection sensor 110 may be used to detect a human body within a given range in front of the position at which the human body detection sensor 110 is provided.

In addition, the image forming apparatus 100 may be operated in a plurality of power modes. To decrease power consumption, the image forming apparatus 100 may use power supplied in a mode selected according to situations. Hereinafter, a method of decreasing the power consumption of the image forming apparatus 100 by quickly determining a power mode using the human body detection sensor 110 according to the state of the image forming apparatus 100 will be described.

Figure 2:
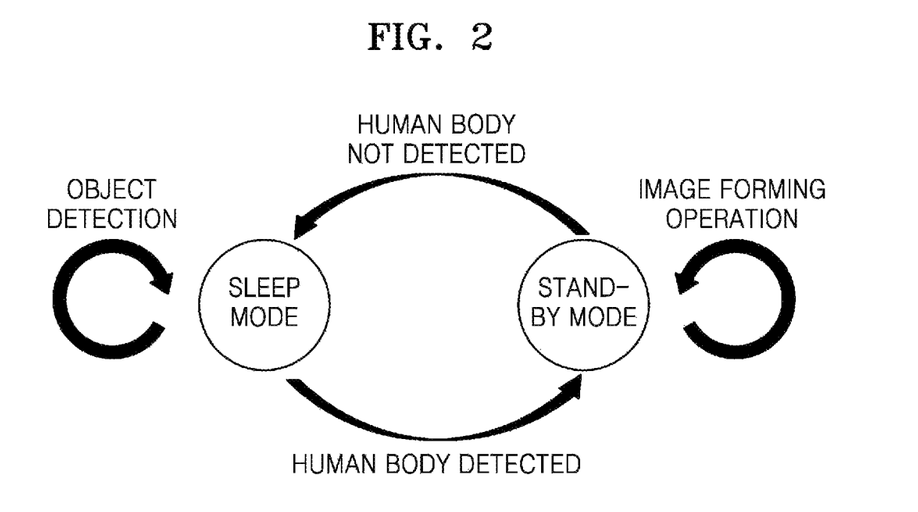
FIG. 2 is a view illustrating switching between a plurality of power modes in the image forming apparatus of the example.

FIG. 2 is a view illustrating switching between a plurality of power modes in the image forming apparatus 100 of the example.

The image forming apparatus 100 may be operated in a plurality of power modes including a sleep mode and a stand-by mode as shown in FIG. 2.

In the sleep mode, power to some portions of the image forming apparatus 100 may be interrupted to decrease the power consumption of the image forming apparatus 100. The sleep mode may be a power mode for reducing the power consumption of the image forming apparatus 100 when the image forming apparatus 100 is not used by any user. For example, in the sleep mode, the human body detection sensor 110 may be maintained in an on-state, and a user interface screen provided on the user interface device 140 may be in an off-state. In the sleep mode, power may be supplied to only a part of hardware of an image forming operation unit 150. In the sleep mode, power may be supplied only to components requiring a relatively long initializing time compared to a given reference, or only to low-power-consuming components.

Power consumption may be higher in the stand-by mode than in the sleep mode. The stand-by mode may be a power mode in which supply of power interrupted in the sleep mode is resumed to prepare for user's use of the image forming apparatus 100 when the image forming apparatus 100 is expected to be used by a user. For example, in the stand-by mode, the user interface screen provided on the user interface device 140 may be turned on to receive an input for manipulating the image forming apparatus 100 from a user. In the stand-by mode, power may be supplied to the hardware of the image forming operation unit 150 to preheat the hardware of the image forming operation unit 150 or prepare for an image forming operation.

If an interrupt such as a user manipulation occurs when the image forming apparatus 100 is in the sleep mode, the image forming apparatus 100 may switch to the stand-by mode. Conversely, if an interrupt such as a user manipulation does not occur for a given period of time or longer when the image forming apparatus 100 is in the stand-by mode, the image forming apparatus 100 may switch to the sleep mode. In this switching between power modes, determination of a power mode and switching to the determined power mode may be more quickly performed if a user approaching the image forming apparatus 100 is previously detected before an interrupt such as a user manipulation occurs.

The image forming apparatus 100 including the human body detection sensor 110 as shown in FIG. 1 may previously detect a user approaching the image forming apparatus 100. When the image forming apparatus 100 is in the sleep mode, the image forming apparatus 100 may detect an object within a given region close to the image forming apparatus 100 by using the human body detection sensor 110. If data detected by the human body detection sensor 110 satisfies a given condition, the image forming apparatus 100 may determine that a user's body approaching the image forming apparatus 100 is detected. If the image forming apparatus 100 determines that a human body is detected using the human body detection sensor 110, the image forming apparatus 100 may switch its power mode from the sleep mode to the stand-by mode. When the image forming apparatus 100 is in the stand-by mode, the user interface device 140 is in an on-state such that a user input may be received and an image forming operation may be performed according to the user input. When it is determined that there is no user input and it is determined based on data sensed by the human body detection sensor 110 that that is no user's body approaching the image forming apparatus 100, the image forming apparatus 100 may switch its power mode from the stand-by mode to the sleep mode if there is no ongoing image forming operation.

Figure 3:
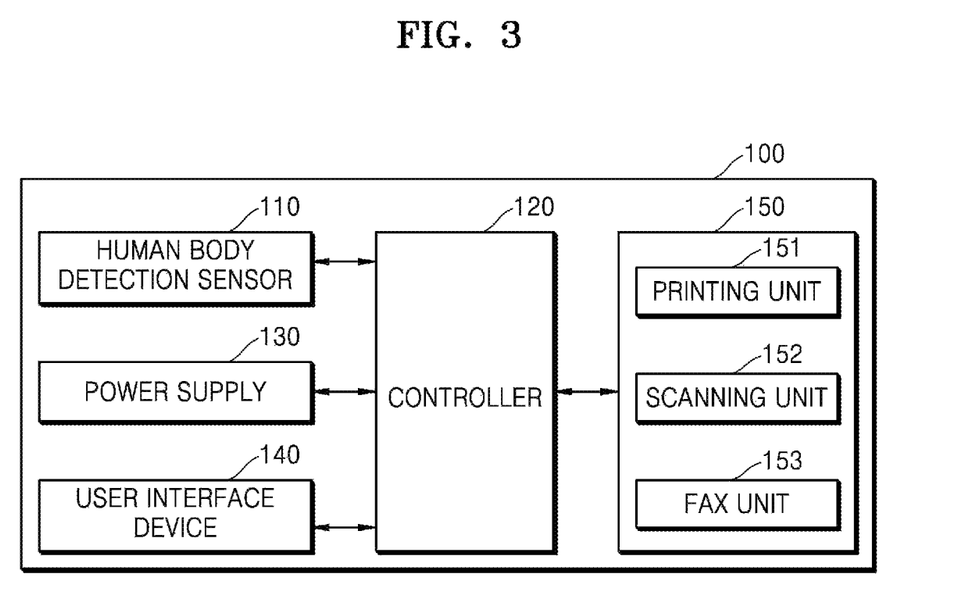
FIG. 3 is a block diagram illustrating a configuration of the image forming apparatus of the example.

FIG. 3 is a block diagram illustrating a configuration of the image forming apparatus 100 according to the example.

Referring to FIG. 3, the image forming apparatus 100 may include the human body detection sensor 110, a controller 120, a power supply 130, the user interface device 140, and the image forming operation unit 150. Those of ordinary skill in the art to which the example of the present disclosure pertains may easily understand that other general-use components may further included in addition to the components illustrated in FIG. 3.

The human body detection sensor 110 may be used to detect a human body approaching the image forming apparatus 100. The human body detection sensor 110 may have an array structure including a plurality of elements. The human body detection sensor 110 may have a two-dimensional array structure including a plurality of columns and a plurality of rows. However, the human body detection sensor 110 is not limited thereto. The human body detection sensor 110 may be a kind of thermal sensor or infrared sensor. The human body detection sensor 110 may transmit detected sensor data to the controller 120.

The controller 120 may control overall operations of the image forming apparatus 100 and may include at least one processor corresponding to each function. The controller 120 may include a random access memory (RAM) (not shown), a read only memory (ROM) (not shown), a central processing unit (CPU) (not shown), a graphic processing unit (GPU) (not shown), etc. Components such as the RAM, ROM, CPU, and GPU may be connected to each other through a data bus. The CPU may access a storage (not shown) and may perform a booting process using an operating system (O/S) stored in the storage. In addition, the CPU may perform various operations using various programs and data stored in the storage. For example, instruction sets for system booting may be stored in the ROM. For example, when the image forming apparatus 100 is powered in response to an input turn-on instruction, the CPU may copy the O/S stored in the storage onto the RAM and execute the O/S for booting according to instructions stored in the ROM. After the booting, the CPU may copy various programs stored in the storage onto the RAM and may perform various operations by executing the programs copied onto the RAM. After the image forming apparatus 100 is completely booted, the CPU may display a user interface screen in a region of the user interface device 140. The controller 120 may perform a control operation corresponding to a user's manipulation input through the user interface device 140.

The controller 120 may determine one of a plurality of power modes based on sensor data detected by the human body detection sensor 110. For example, as described with reference to FIG. 2, the controller 120 may select the sleep mode or the stand-by mode based on sensor data detected by the human body detection sensor 110. Each component of the image forming apparatus 100 may be operated using power supplied in a power mode determined by the controller 120.

The controller 120 may switch the power mode of the image forming apparatus 100 using results of calculations performed with respect to array lines of the human body detection sensor 110 based on sensor data detected by the human body detection sensor 110. At this time, the array lines of the human body detection sensor 110 may be array lines in a column direction, a row direction, or a diagonal direction. The following description will be given for the case in which results of calculations performed with respect column-direction array lines of the controller 120 are used to determine whether a human body is detected. However, this is a non-limiting example.

If a first condition is satisfied based on sensor data detected by the human body detection sensor 110, the controller 120 may switch the power mode from the sleep mode to the stand-by mode in which more power is consumed than in the sleep mode, wherein the first condition is a condition in which results of calculations performed on a given number or more of consecutive columns of a plurality of columns of the human body detection sensor 110 are each equal to or greater than a threshold value simultaneously for a given period of time. If a result of calculation performed on any one of columns of the human body detection sensor 110 is equal to or greater than the threshold value for the given period of time, the controller 120 may determine whether the first condition is satisfied. When there is no user input through the user interface device 140, the first condition is not satisfied, and there is no ongoing image forming operation in the stand-by mode, the controller 120 may switch the power mode from the stand-by mode to the sleep mode. The controller 120 may control the power supply 130 to supply power corresponding to the switched power mode to the user interface device 140 and the image forming operation unit 150.

Figure 4:
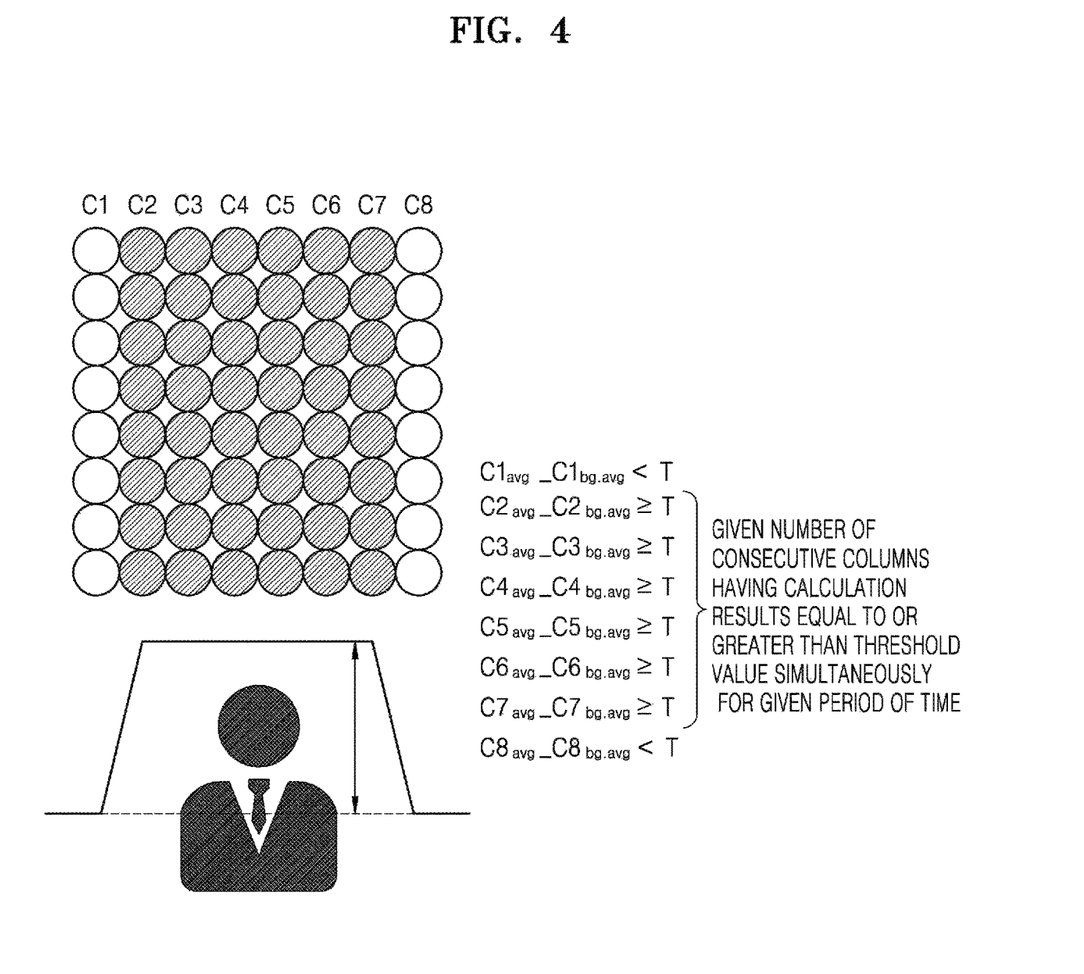
FIG. 4 is a view illustrating a method of detecting a human body using a human body detection sensor of the image forming apparatus of the example.

FIG. 4 is a view illustrating a method of detecting a human body using the human body detection sensor 110 of the image forming apparatus 100 of the example.

Referring to FIG. 4, the human body detection sensor 110 has a two-dimensional array structure with an 8×8 size. However, the human body detection sensor 110 is not limited thereto. In addition, although FIG. 4 illustrates a method of using results of calculations performed with respect to column-direction array lines of the human body detection sensor 110 to determine whether a human body is detected, the same method may be used for the case of row-direction array lines or diagonal array lines of the human body detection sensor 110.

In the human body detection sensor 110 having a two-dimensional array structure having a plurality of columns, if each result of calculations on a given number or more of consecutive columns satisfy a given condition, it may be determined that a human body is detected. The given number or more of consecutive columns may be all or some of the columns of the human body detection sensor 110 and may vary according to the size of the human body detection sensor 110. For example, in the human body detection sensor 110 having an 8×8 size shown in FIG. 4, if the average temperature values of six or more consecutive columns are each equal to or greater than a threshold value simultaneously for a given period of time, it may be determined that a human body is detected. As shown in FIG. 4, the human body detection sensor 110 may include columns C1 to C8, that is, eight columns in total. If the average temperature values of the columns C2 to C7 are respectively greater than corresponding average background temperature values obtained before a temperature variation by a threshold value or greater simultaneously for a given period of time, it may be determined that a human body is detected, and the power mode may be may be switched from the sleep mode to the stand-by mode in which power consumption is higher than in the sleep mode.

Referring again to FIG. 3, the power supply 130 converts AC voltage supplied from an external power source into DC voltage for the image forming apparatus 100 by using a transformer. In each of a plurality of power modes, the power supply 130 may supply power corresponding to the power mode to each component of the image forming apparatus 100.

The user interface device 140 may receive inputs from users and may display information for users. The user interface device 140 may include an input unit, for example, to receive an input from a user for performing an image forming operation. The user interface device 140 may include an output unit to display information about an image forming operation or information about the state of the image forming apparatus 100. For example, the user interface device 140 may be of a touchscreen type including an operation panel for receiving a user input and a display panel for displaying a screen.

The image forming operation unit 150 is illustrated as having a printing unit 151, a scanning unit 152, and a fax unit 153. However, if necessary, the image forming operation unit 150 may include only some of the listed components or may further include other components for performing a different type of image forming operation. The image forming operation unit 150 may include a hardware configuration for image forming operations and may further include dedicated machine readable instructions for image forming operations. The printing unit 151 may form an image on a recording media by various printing methods such as an electrophotographic method, an inkjet method, a thermal transfer method, and a thermal method. The scanning unit 152 may read an image recorded on a document by emitting light to the document and receiving light reflected from the document. The fax unit 153 may share an image scanning structure with the scanning unit 152 and a file printing structure with the printing unit 151, and may transmit a scanned file to a destination or receive an external file.

Figure 5:
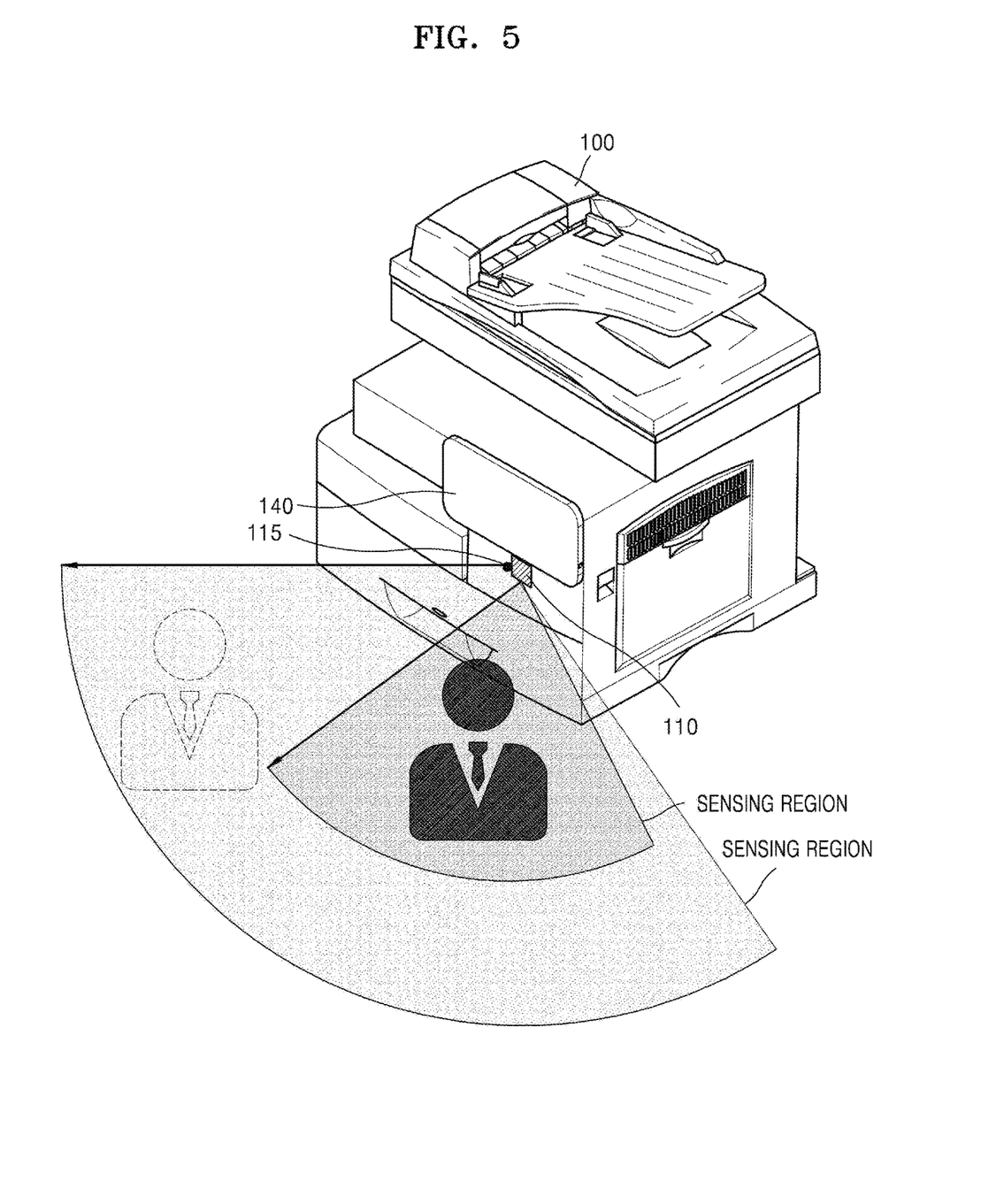
FIG. 5 is a view illustrating an image forming apparatus according to another example.

FIG. 5 is a view illustrating an image forming apparatus 100 according to another example.

Referring to FIG. 5, the positions of a human body detection sensor 110, a motion detection sensor 115, and a user interface device 140 on the image forming apparatus 100 are illustrated. The human body detection sensor 110 and the motion detection sensor 115 may be provided on at least one lateral outer surface of the image forming apparatus 100. For example, the human body detection sensor 110 and the motion detection sensor 115 may be located on a lateral surface of the image forming apparatus 100 on which the user interface device 140 is located. The human body detection sensor 110 and the motion detection sensor 115 may be provided close to the user interface device 140 to detect the body and motions of a user approaching the user interface device 140 to use the image forming apparatus 100. The human body detection sensor 110 may be used to detect a human body within a given range in front of the position at which the human body detection sensor 110 is provided. The motion detection sensor 115 may be used to detect motions within a given range in front of the position at which the motion detection sensor 115 is provided. The sensing region of the motion detection sensor 115 may be greater than the sensing region of the human body detection sensor 110.

Hereinafter, a method of decreasing the power consumption of the image forming apparatus 100 by quickly determining a power mode using the human body detection sensor 110 and the motion detection sensor 115 according to the state of the image forming apparatus 100 will be described.

Figure 6:
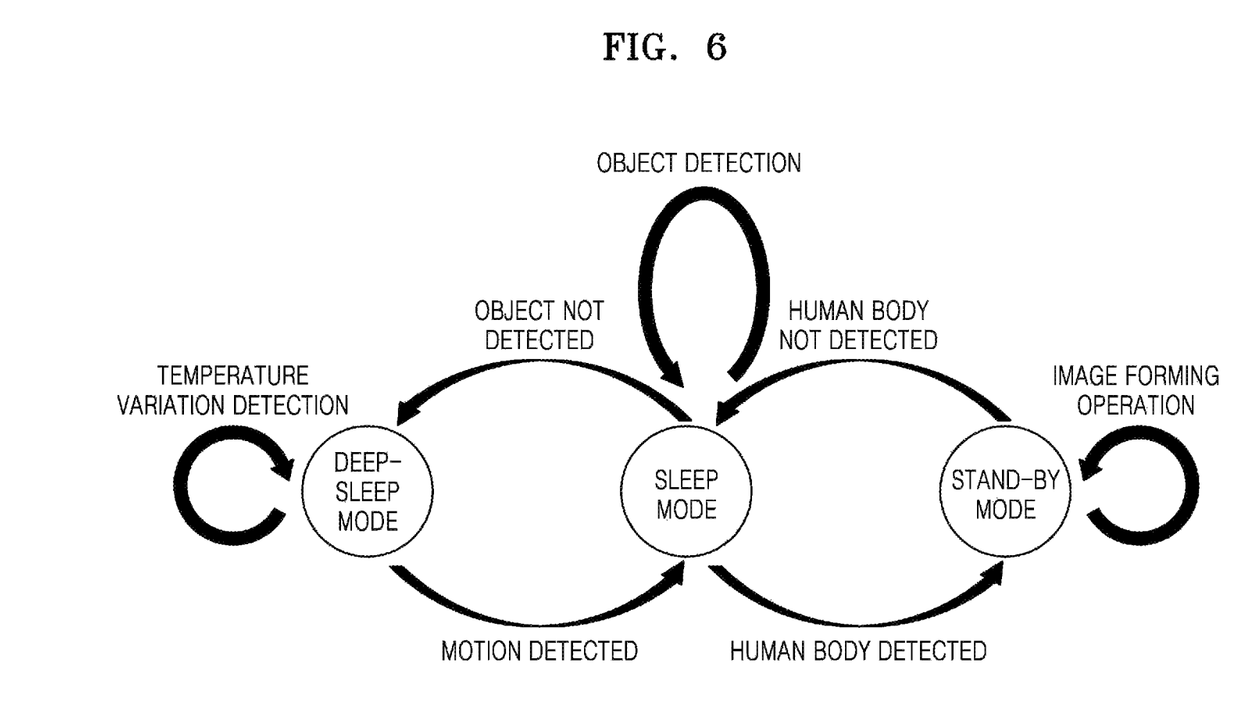
FIG. 6 is a view illustrating switching between a plurality of power modes in the image forming apparatus of the other example.

FIG. 6 is a view illustrating switching between a plurality of power modes in the image forming apparatus 100 of the other example. The same description of switching between a plurality of power modes given with reference to FIG. 2 will not be repeated here.

The image forming apparatus 100 may be operated according to a plurality of power modes including a deep-sleep mode, a sleep mode, and a stand-by mode as shown in FIG. 6.

The deep-sleep mode may be a power mode in which power consumption is lowest. If the motion detection sensor 115 does not detect a temperature variation equal to or greater than a given value within a sensing region, power supplied to most components of the image forming apparatus 100 may be interrupted to operate the image forming apparatus 100 in the deep-sleep mode having the lowest power consumption. If it is determined that there is even no motion made by a user approaching the image forming apparatus 100 to use the image forming apparatus 100, the deep-sleep mode may be selected as a mode having lower power consumption than the sleep mode. For example, in the deep-sleep mode, the motion detection sensor 115 may be maintained in an on-state, and power may be supplied to only a minimal configuration used to detect motions using the motion detection sensor 115.

In switching between power modes such as the deep-sleep mode, the sleep mode, and the stand-by mode, if the body or a motion of a user approaching the image forming apparatus 100 is previously detected before an interruption such as a user's manipulation, determination of a power mode and switching to the power mode may be quickly carried out.

The image forming apparatus 100 including the motion detection sensor 115 and the human body detection sensor 110 may be provided as shown in FIG. 5 in order to previously detect the body and a motion of a user approaching the image forming apparatus 100. When the image forming apparatus 100 is in the deep-sleep mode, the image forming apparatus 100 may detect temperature variations within a given region near the image forming apparatus 100 by using the motion detection sensor 115. If a user moves in the sensing region of the motion detection sensor 115, temperature variations may occur according to the movement of the user. If sensor data detected by the motion detection sensor 115 satisfies a given condition, the image forming apparatus 100 may determine that a motion of a user approaching the image forming apparatus 100 is detected. If it is determined that a motion of a user is detected using the motion detection sensor 115, the image forming apparatus 100 may switch its power mode from the deep-sleep mode to the sleep mode. When the image forming apparatus 100 is in the sleep mode, the human body detection sensor 110 is turned on to detect an object within a given region near the image forming apparatus 100, and if it is determined that the body of a user is detected, the image forming apparatus 100 may switch from the sleep mode to the stand-by mode. When the image forming apparatus 100 is in the sleep mode, if any result of calculations performed on columns of the human body detection sensor 110 based on sensor data detected using the human body detection sensor 110 is not equal to or greater than a threshold value for a given period of time, the image forming apparatus 100 may determine that no object including a human body is detected and may switch its power mode from the sleep mode to the deep-sleep mode.

Figure 7:
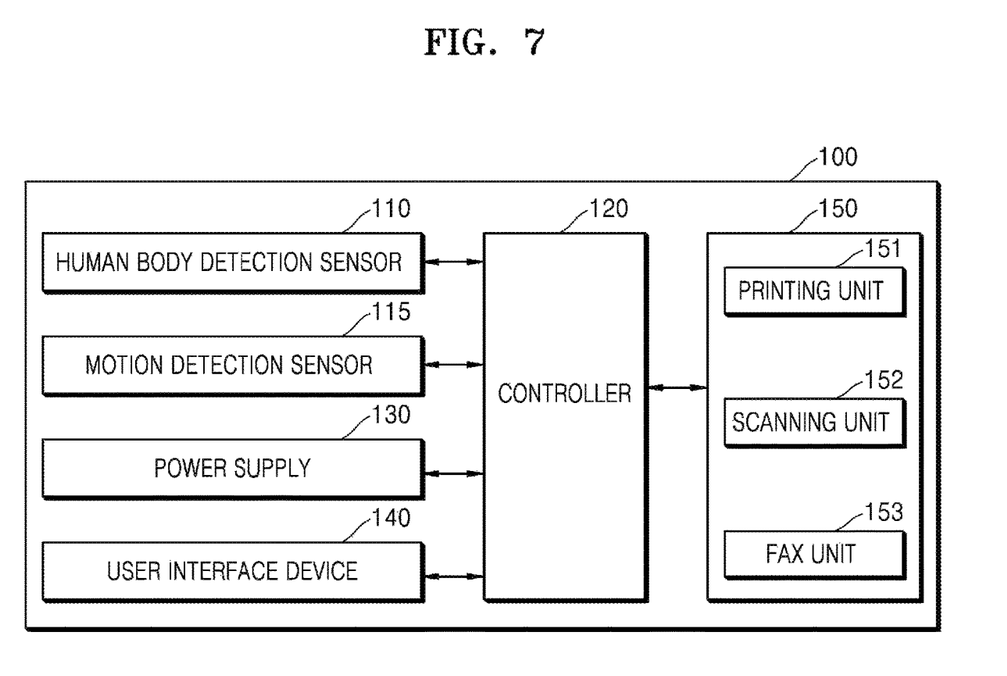
FIG. 7 is a block diagram illustrating a configuration of the image forming apparatus of the other example.

FIG. 7 is a block diagram illustrating the image forming apparatus 100 of the other example. Descriptions of the same components as those of the image forming apparatus 100 of to FIG. 3 will be omitted.

Referring to FIG. 7, the image forming apparatus 100 may include the human body detection sensor 110, the motion detection sensor 115, a controller 120, a power supply 130, the user interface device 140, and the image forming operation unit 150.

The motion detection sensor 115 may be used to detect motions of a user approaching the image forming apparatus 100. The motion detection sensor 115 may be a pyroelectric sensor such as a passive infrared (PIR) sensor. The motion detection sensor 115 may be used to detect motions of a user by sensing temperature variations caused by user's motions. The motion detection sensor 115 may transmit detected sensor data to the controller 120. The motion detection sensor 115 may acquire sensor data within a larger region than the human body detection sensor 110.

The controller 120 may determine one of a plurality of power modes based on sensor data detected by the human body detection sensor 110 and the motion detection sensor 115. For example, as described with reference to FIG. 6, the controller 120 may determine the deep-sleep mode, the sleep mode, and the stand-by mode based on sensor data detected by the human body detection sensor 110 and the motion detection sensor 115. Each component of the image forming apparatus 100 may be operated using power supplied in a power mode determined by the controller 120.

If it is determined, based on sensor data detected by the motion detection sensor 115, that a second condition is satisfied, that is, a temperature variation detected by the motion detection sensor 115 is equal to or greater than a threshold value for detecting a motion, the controller 120 may switch the power mode to the sleep mode from the deep-sleep mode in which less power is consumed than in the sleep mode. The controller 120 may maintain the deep-sleep mode if the second condition is not satisfied. If a result of calculation performed on any one of the columns of the human body detection sensor 110 is not equal to or greater than a threshold value for a given period of time, the controller 120 may switch the power mode from the sleep mode to the deep-sleep mode.

Figure 8:
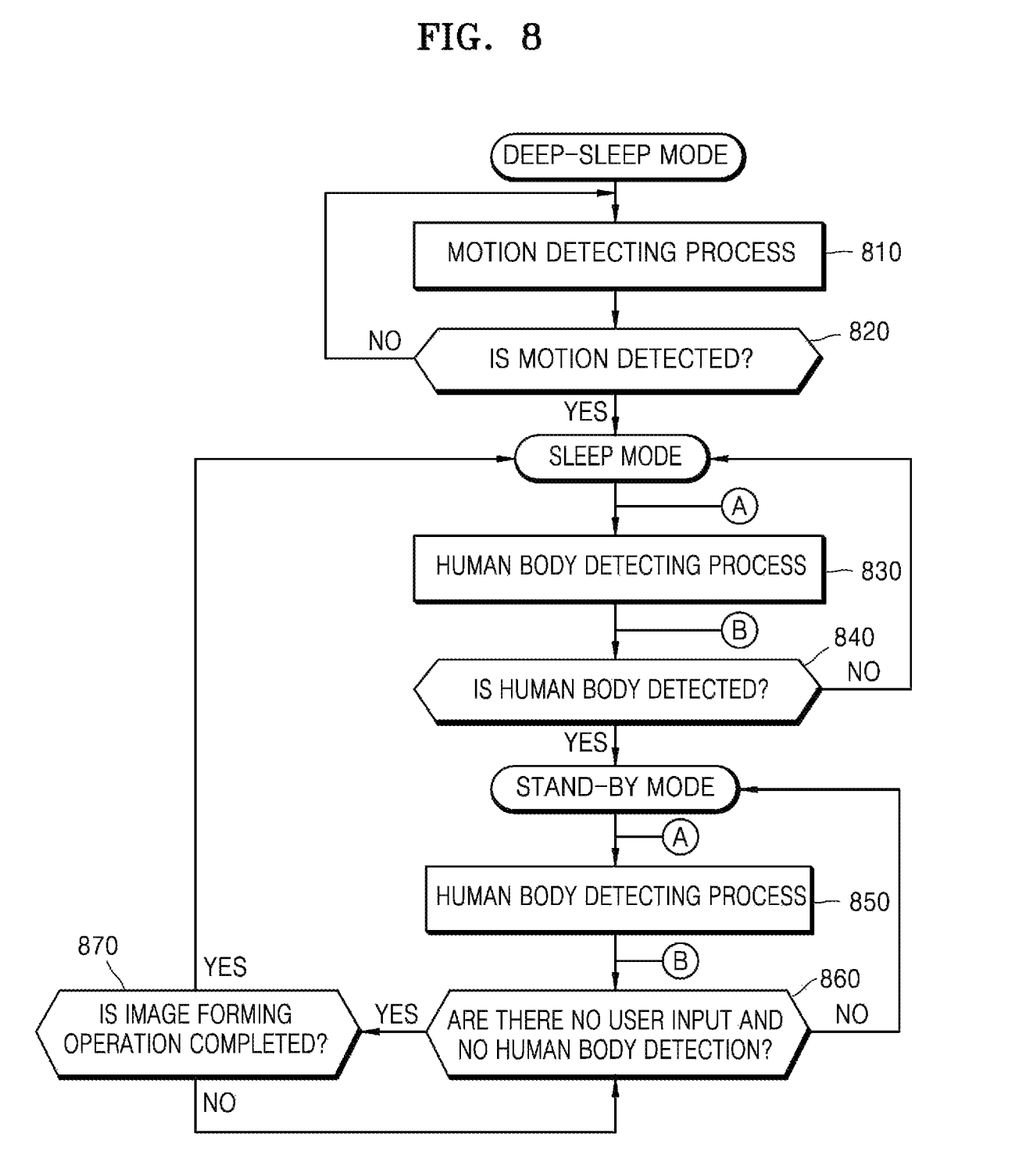
FIG. 8 is a flowchart illustrating a method of switching the power mode of the image forming apparatus according to an example.

FIG. 8 is a flowchart illustrating a method of switch the power mode of the image forming apparatus 100 according to an example. The above description of the image forming apparatus 100 may be applied to the method of switching the power mode of the image forming apparatus 100 even though they are not repeated below.

The image forming apparatus 100 may supply power to components thereof such as the user interface device 140 and the image forming operation unit 150 according to power modes illustrated in FIG. 8. Hereinafter, with reference to FIG. 8, switching to a power mode such as the deep-sleep mode, the sleep mode, or the stand-by mode, and operations of the image forming apparatus 100 will be described.

When the image forming apparatus 100 is left without a user approaching the image forming apparatus 100, the image forming apparatus 100 may be operated in the deep-sleep mode having the lowest power consumption.

In block 810, the image forming apparatus 100 may perform a motion detecting process. The image forming apparatus 100 may determine, based on sensor data detected by the motion detection sensor 115, whether a second condition is satisfied, that is, whether a temperature variation detected by the motion detection sensor 115 is equal to or greater than a threshold value for detecting a motion. If the second condition is satisfied, it may be considered that a motion of a user is detected.

In block 820, if a motion of a user approaching the image forming apparatus 100 is not detected, the image forming apparatus 100 may continue the motion detecting process. If a motion of a user approaching the image forming apparatus 100 is detected, the image forming apparatus 100 may switch its power mode from the deep-sleep mode to the sleep mode.

In the sleep mode, power consumption may be higher than in the deep-sleep mode, but lower than in the stand-by mode.

In block 830, the image forming apparatus 100 may perform a human body detecting process in the sleep mode. The human body detecting process will now be described below with reference to FIG. 9.

Figure 9:
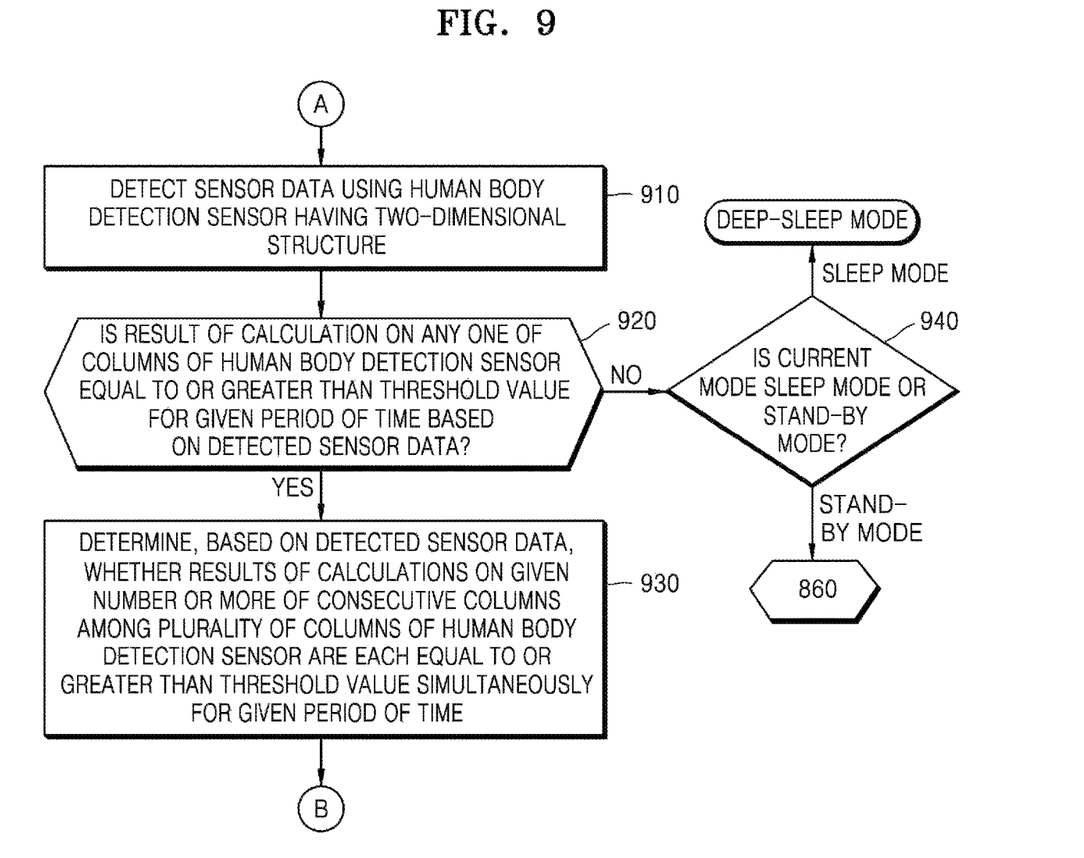
FIG. 9 is a flowchart illustrating a process of detecting a human body in the image forming apparatus according to an example.

FIG. 9 is a flowchart illustrating a process of detecting a human body in the image forming apparatus 100 according to an example. The image forming apparatus 100 may use results of calculations performed with respect to array lines of the human body detection sensor 110 based on sensor data detected by the human body detection sensor 110 in order to determine whether a human body is detected. At this time, the array lines of the human body detection sensor 110 may be array lines in a column direction, a row direction, or a diagonal direction. FIG. 9 describes a process of using results of calculations performed on column-direction array lines of the controller 120 to determine whether a human body is detected. However, this is a non-limiting example.

In block 910, the image forming apparatus 100 may detect sensor data using the human body detection sensor 110 having a two-dimensional array structure.

In block 920, the image forming apparatus 100 may determine, based on sensor data detected by the human body detection sensor 110, whether a result of calculation on any one of the columns of the human body detection sensor 110 is equal to or greater than a threshold value for a given period of time. If there is a column having a calculation result equal to or greater than the threshold value, the process may proceed to block 930, and if not, the process may proceed to block 940.

In block 930, the image forming apparatus 100 may determine, based on the sensor data detected by the human body detection sensor 110, whether a first condition is satisfied, that is, results of calculations performed on a given number or more of consecutive columns of a plurality of columns of the human body detection sensor 110 are each equal to or greater than the threshold value simultaneously for the given period of time. The first condition may be a condition for detecting the body of a user. For example, the image forming apparatus 100 may determine whether the average temperature values of the given number or more of the columns of the human body detection sensor 110 are respectively greater than corresponding average background temperature values obtained before a temperature variation by the threshold value or greater simultaneously for the given period of time.

In block 940, if the current power mode is the sleep mode, the image forming apparatus 100 switches to the deep-sleep mode, and if the current power mode is the stand-by mode, the image forming apparatus 100 may proceed to block 860 shown in FIG. 8.

Referring again to FIG. 8, in block 840, if the body of a user approaching the image forming apparatus 100 is not detected, the image forming apparatus 100 may continue the human body detecting process in the sleep mode. If the body of a user approaching the image forming apparatus 100 is detected, the image forming apparatus 100 may switch its power mode to the stand-by mode in which power consumption is higher than in the sleep mode.

In the stand-by mode, the image forming apparatus 100 may perform an image forming operation according to a user input.

In block 850, the image forming apparatus 100 may perform the human body detecting process in the stand-by mode. The same process as the human body detecting process in block 830 described with reference to FIG. 9 may be performed. However, in block 940, since the current power mode is the stand-by mode, the method may proceed to block 860 to determine again whether there is no user input through the user interface device 140 and whether the body of a user is not detected.

In block 860, if there is no user input through the user interface device 140 and the body of a user is not detected in the stand-by mode, the image forming apparatus 100 may check whether there is an ongoing image forming operation. In the stand-by mode, if there is a user input through the user interface device 140 or the body of a user is detected, the image forming apparatus 100 may be stay in the stand-by mode.

In block 870, if there is no user input through the user interface device 140 and the body of a user is not detected in the stand-by mode, the image forming apparatus 100 may switch its power mode from the stand-by mode to the sleep mode. However, if there is an ongoing image forming operation, the method may proceed to block 860 to determine again whether there is no user input through the user interface device 140 and whether the body of a user is not detected.

In addition, the method of switching the power mode of the image forming apparatus 100 may be implemented in the form of instructions executable on computers or processors or non-transitory computer-readable recording media storing data. In addition, the method may be written as computer programs executable on computers and may be implemented in general-use digital computers that execute the programs using non-transitory computer readable recording media. Examples of the non-transitory computer-readable recording media include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks (SSDs), and any device capable of storing the instructions or software and any associated data, data files, and data structures in a non-transitory manner and providing the instructions or software and any associated data, data files, and data structures to a processor or computer so that the processor or computer may execute the instructions.

While one or more examples have been described with reference to the figures, it will be understood by those of ordinary skill in the art that various changes in form and details may be made therein without departing from the spirit and scope as defined by the following claims.

What is claimed is:

1. An image forming apparatus comprising:
   a user interface device;
   an image forming operation unit;
   a detection sensor array having a two-dimensional array structure of sensors, the two-dimensional array structure including a plurality of sensor columns of the sensors;
   a power supply to supply power to the user interface device or the image forming operation unit, according to a plurality of power modes, the plurality of power modes including a sleep mode and a stand-by mode, in which the power supply is to supply more power in the stand-by mode than in the sleep mode; and
   a controller device to:
      switch a power mode from the sleep mode to the stand-by mode, when a first condition is satisfied based on sensor data detected by the sensor columns, the first condition being a condition in which calculated values of calculations performed on sensor data corresponding to a number of consecutive sensor columns among the plurality of sensor columns, each calculated value corresponding to an average of detected values of sensors in a respective sensor column from the number of the consecutive sensor columns, are each maintained to be equal to or greater than a threshold value simultaneously for a set period of time, to indicate detection of a human body, and
      control the power supply to supply power corresponding to the stand-by mode to the user interface device or the image forming operation unit.

2. The image forming apparatus of claim 1, wherein, when the calculated values are, simultaneously for the set period of time, respectively maintained to be equal to or greater than average background temperature values as the threshold value, each average background temperature value corresponding to the average of the detected values of the sensors obtained before a temperature variation in the corresponding sensor column among the plurality of sensor columns, the controller device is to switch the power mode from the sleep mode to the stand-by mode.

3. The image forming apparatus of claim 1, wherein, when a calculated value of calculation performed on sensor data corresponding to an average of detected values of sensors in any one sensor column among the plurality of sensor columns of the detection sensor array is maintained to be equal to or greater than the threshold value for the set period of time, the controller device is to determine whether the first condition is satisfied.

4. The image forming apparatus of claim 1, wherein,
while in the stand-by mode, when no user input is input through the user interface device, when the first condition is not satisfied, and when no ongoing image forming operation is performed by the image forming operation unit, the controller device is to switch the power mode from the stand-by mode to the sleep mode.

5. The image forming apparatus of claim 1, further comprising a motion detection sensor,
wherein,
the plurality of power modes includes a deep-sleep mode, in which the power supply supplies less in the deep-sleep mode than in the sleep mode, and
the controller device is to switch the power mode to the sleep mode from the deep-sleep mode, when a second condition is satisfied based on motion sensor data detected by the motion detection sensor, the second condition being a condition in which a temperature variation detected by the motion detection sensor is equal to or greater than a motion threshold value for detecting a motion.

6. The image forming apparatus of claim 5, wherein the motion detection sensor is capable of detecting motion sensor data corresponding to a larger region than the detection sensor array is.

7. The image forming apparatus of claim 1, wherein,
the plurality of power modes includes a deep-sleep mode, in which the power supply supplies less power in the deep-sleep mode than in the sleep mode, and
when a calculated value of calculation performed on sensor data corresponding to each of the sensor columns of the plurality of sensor columns is not equal to or greater than the threshold value for the set period of time, the controller device is to switch the power mode from the sleep mode to the deep-sleep mode.

8. A method of switching a power mode of an image forming apparatus, the method comprising:
obtaining sensor data detected by a detection sensor array having a two-dimensional array structure, the two-dimensional array structure including a plurality of sensor columns of the sensors;
determining, based on sensor data, whether a first condition is satisfied, the first condition being a condition in which calculated values of calculations performed on sensor data corresponding to a number of consecutive sensor columns among the plurality of sensor columns, each calculated value corresponding to an average of detected values of sensors in a respective sensor column from the number of the consecutive sensor columns, are each maintained to be equal to or greater than a threshold value simultaneously for a set period of time, to indicate detection of a human body;
in response to determining that the first condition is satisfied, switching the power mode from a sleep mode to a stand-by mode, in which the image forming apparatus consumes more power in the stand-by mode than in the sleep mode; and
controlling a power supply to supply power corresponding to the stand-by mode to a user interface device or an image forming operation unit included in the image forming apparatus.

9. The method of claim 8, wherein,
determining whether the first condition is satisfied comprises
determining whether the calculated values are, simultaneously for the set period of time, respectively maintained to be equal to or greater than average background temperature values as the threshold value, each average background temperature value corresponding to the average of the detected temperature values of the sensors obtained before a temperature variation in the corresponding sensor column among the plurality of sensor columns.

10. The method of claim 8, wherein determining whether the first condition is satisfied is performed when a calculated value of calculation performed on sensor data corresponding to an average of detected values of sensors in any one sensor column among the plurality of sensor columns of the detection sensor array is maintained to be equal to or greater than the threshold value for the set period of time.

11. The method of claim 8, further comprising:
determining whether no user input is input through the user interface device and whether the first condition is not satisfied in the stand-by mode; and
in response to the determining that no user input is input through the user interface device and the first condition is not satisfied, when no ongoing image forming operation is performed by the image forming operation unit in the stand-by mode, switching the power mode from the stand-by mode to the sleep mode.

12. The method of claim 8, further comprising:
detecting motion sensor data using a motion detection sensor;
determining, based on motion sensor data detected using the motion detection sensor, whether a second condition is satisfied, the second condition being a condition in which a temperature variation detected by the motion detection sensor is equal to or greater than a motion threshold value for detecting a motion; and
when the second condition is satisfied, switching the power mode to the sleep mode from a deep-sleep mode, in which the image forming apparatus consumes less power in the deep-sleep mode than in the sleep mode.

13. The method of claim 12, wherein the motion detection sensor is capable of detecting motion sensor data corresponding to a larger region than the detection sensor array is.

14. The method of claim 8, further comprising:
determining whether a calculated value of calculation performed on sensor data corresponding to each of the sensor columns of the plurality of sensor columns is not equal to or greater than the threshold value for the set period of time; and
in response to determining that the calculated value of calculation corresponding to each of the sensor columns of the plurality of sensor columns is not equal to or greater than the threshold value for the set period of time, switching the power mode from the sleep mode to a deep-sleep mode, in which the image forming apparatus consumes less power in the deep-sleep mode than in the sleep mode.

15. A non-transitory computer-readable recording medium storing instructions to be executed by a processor for an image forming apparatus to cause a process comprising:
obtaining sensor data detected by using a detection sensor array having a two-dimensional array structure of sensors, the two-dimensional array structure including a plurality of sensor columns of the sensors;

determining whether a first condition is satisfied, the first condition being a condition in which calculated values of calculations performed on sensor data corresponding to a number of consecutive sensor columns among the plurality of sensor columns, each calculated value corresponding to an average of detected values of sensors in a respective sensor column from the number of the consecutive sensor columns, are each maintained to be equal to or greater than a threshold value simultaneously for a set period of time, to indicate detection of a human body;

in response to the determining that the first condition is satisfied, switching a power mode from a sleep mode to a stand-by mode in which the image forming apparatus consumes more power in the stand-by mode than in the sleep mode; and Instructions, when executed by the processor, to cause controlling a power supply to supply power corresponding to the stand-by mode to a user interface device or an image forming operation unit included in the image forming apparatus.

\* \* \* \* \*